United States Patent [19]

Martin et al.

[11] Patent Number: 5,709,394
[45] Date of Patent: *Jan. 20, 1998

[54] SUSPENSION MEANS FOR A UTILITY VEHICLE

[75] Inventors: Jean-Paul Marcel Lucien Martin, Le Fenouiller; Louis Jean-Baptiste Pambrun, La Roche sur Yon, both of France

[73] Assignee: New Holland Braud S.A., Coex, France

[*] Notice: The term of this patent shall not extend beyond the expiration date of Pat. No. 5,538,266.

[21] Appl. No.: 779,747

[22] Filed: Jan. 10, 1997

[51] Int. Cl.$^6$ ........................................... B60S 9/00
[52] U.S. Cl. .................. 280/6.11; 280/6.12; 280/6.1; 180/41
[58] Field of Search ..................... 280/6.12, 6.1, 280/6.11, 840, 703, 772, 714; 180/41

[56] References Cited

U.S. PATENT DOCUMENTS

| | | | |
|---|---|---|---|
| 3,558,148 | 1/1971 | Johnson | 280/6.11 |
| 3,909,022 | 9/1975 | Claxton | 280/6 H |
| 4,090,723 | 5/1978 | Hart | 280/6.11 X |
| 4,152,004 | 5/1979 | Schroder | 280/111 |
| 4,247,126 | 1/1981 | Claxton | 280/6 H |
| 4,696,152 | 9/1987 | Kizenbaw | 280/6.11 |
| 5,388,857 | 2/1995 | Wernimont et al. | 280/708 |
| 5,447,331 | 9/1995 | Barnhart | 280/840 |
| 5,538,266 | 7/1996 | Martin et al. | 280/16.2 |

FOREIGN PATENT DOCUMENTS

| | | |
|---|---|---|
| 2518464 | 6/1983 | France . |
| 1486255 | 9/1977 | United Kingdom . |
| 2291018 | 1/1996 | United Kingdom . |

OTHER PUBLICATIONS

Copy of European Search Report For Application #GB 9600693.7 dated Feb. 22, 1996.

*Primary Examiner*—Christopher P. Ellis
*Attorney, Agent, or Firm*—Larry W. Miller; John W. Stader; Frank A. Seemar

[57] ABSTRACT

A utility vehicle, such as a grape harvester (1), comprises a straddling frame (2), supported at its front and rear ends by double-acting hydraulic cylinders (17, 18 and 23, 24), which can be extended or retracted for levelling the frame (2). During horizontal or uphill travel, the rear cylinders (23, 24) are blocked for providing the vehicle (1) with a fixed rear axle (55), while the front cylinders (16, 17) are hydraulically interconnected in order to let them extend or retract in opposition to each other for providing the vehicle (1) with an oscillating front axle (56). During downhill travel the front cylinders (17, 18) are blocked for fixing said front axle (56) to the frame (2) and the rear cylinders (23, 24) are hydraulically interconnected for letting the rear axle (55) oscillate to the frame (2). The rear and front oscillation is controlled by an inclination sensor (91). This control system on the one hand provides improved stability to the vehicle (1) when working on sloping ground and on the other hand ensures full ground contact for all wheels.

14 Claims, 5 Drawing Sheets

SUSPENSION MEANS FOR A UTILITY VEHICLE

FIELD OF THE INVENTION

This invention relates generally to utility vehicles, such as vineyard tractors, grape or berry harvesters or other harvesting machines, which have been developed for use on sloping as well as level fields, and more particularly to suspension means for improving the stability of the vehicle when traveling uphill or downhill. This invention is directed to an improvement to a suspension for a utility vehicle of the type disclosed in U.S. Pat. No. 5,538,266, issued Jul. 23, 1996 in the name of Jean-Paul M. L. Martin, et al, and is assigned to a common assignee.

BACKGROUND OF THE INVENTION

Utility vehicles usually are operated on rough and uneven ground. They have a frame with significant ground clearance for preventing unwanted interference with the soil surface. Typically, the frame is supported on four or more wheels, the front pair of which is articulately mounted to the frame, while the rear wheels are kept in a substantially fixed position relative to the frame. The combination of fixed and articulated wheels insures full ground contact during normal operations. In configurations where all wheels are driven, it is particularly important that the wheels are kept in firm ground engagement during operation. Otherwise, the wheel or wheels which loses or lose contact, may start to spin such that a portion of the traction power is lost.

The position of the vehicle frame is defined by the fixed wheels. When one of the fixed rear wheels enters into a pit or travels over a bump the frame is tilted sideways, while the articulated front wheels remain on the ground. When operating on substantially level terrain, small lateral movements of the frame following from instant variations in the ground contour will cause no problems to the stability of the vehicle. However, it has been experienced that the same amount of motion may be fatal to the stability when the vehicle is travelling along a steep downhill slope. The frame then may pivot about an articulation point at the front of the vehicle and tip over.

U.S. Pat. No. 4,247,126, issued Jan. 27, 1981 in the name of Gerald L. Claxton, relates to apparatus exemplary of prior art utility vehicles adapted for use in sloping terrain. This patent discloses a suspension system for a grape harvester which is designed for travelling over the rows of vines, such that it has a high center of gravity. The wheels are mounted to double-acting hydraulic cylinders for adjustment of the frame height to the ground and the vines. During normal harvesting operation the rear cylinders are hydraulically blocked as to maintain the rear wheels in a fixed position relative to the frame, thereby providing the vehicle with a fixed rear axle.

The upper and lower chambers of the one front cylinder are permanently connected to the corresponding chambers of the other front cylinder, such that the retraction of the one cylinder causes the extension of the other cylinder by an equal amount. The front of the frame is still supported by the oil enclosed in the upper chambers, but the front wheels are free to move up and down, as if they were mounted on an oscillating axle. This embodiment presents good stability characteristics when travelling on level terrain or uphill slopes, but may turn unstable during steep downhill travel.

In order to remedy thereto, means may be provided for limiting the free circulation of the oil between the front cylinders. To this end, French Patent No. 2,518,464 is cited, in that it shows a vehicle with a fixed front axle and an oscillating rear axle, whereof the position is controlled by a pair of interconnected cylinders. When the angle of the frame to the horizontal exceeds a predetermined value, the flow of the oil between the cylinders is restricted by a non-return valve, such that the rear axle will behave as a second fixed axle and the stability of the vehicle is thereby restored. However, during further travel over the uneven ground, one of the wheels may loose contact with the ground. When this wheel is one of the driven wheels, it will start spinning and motive power will be lost.

SUMMARY OF THE INVENTION

It therefore is an important object of the present invention to overcome the drawbacks of prior art arrangements and provide means for, on the one hand improving the stability of the vehicle and, on the other hand maintaining all wheels or other ground-engaging members in full engagement with the ground during uphill and downhill travel over uneven ground.

In pursuance of this and other important objects, the present invention provides for new and useful improvements to a utility vehicle having a generally horizontal, rectangular frame with opposed sides and opposed ends; two first ground-engaging members at a first end of the frame; two second ground-engaging members at an opposite second end of the frame; first suspension means supportingly mounted between the frame and the first ground-engaging members, and comprising first oscillation means for accomplishing movement of one first ground-engaging member in opposition to the movement of the other first ground-engaging member; suspension control means, comprising first oscillation control means, operatively linked to said first oscillation means and changeable between an enabling and an inhibiting state, wherein movement of the first ground-engaging members is permitted and prohibited respectively; and, second suspension means, supportingly mounted between the frame and the second ground-engaging members. More particularly, the invention contemplates a vehicle as set forth above wherein the second suspension means comprise second oscillation means for accomplishing movement of one second ground-engaging member in opposition to the movement of the other second ground-engaging member, and the suspension control means further comprise second oscillation control means, operatively linked to the second oscillation means and changeable between an enabling and an inhibiting state, wherein said movement of the second ground-engaging members is permitted and prohibited respectively.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
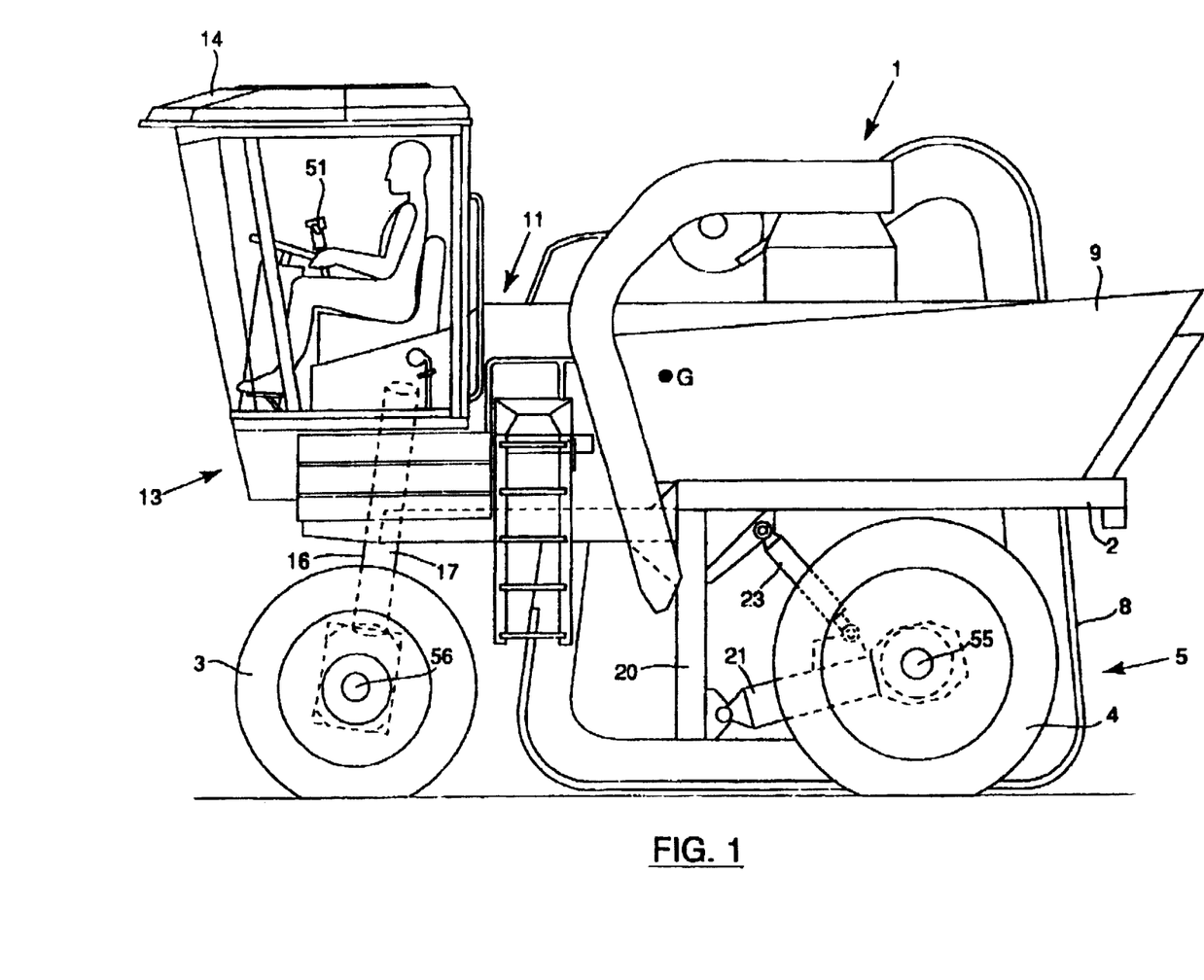
FIG. 1 is a schematic side view of a grape harvester, comprising a frame, sustained by four hydraulic cylinders, to which the wheels are attached.
Figure 2:
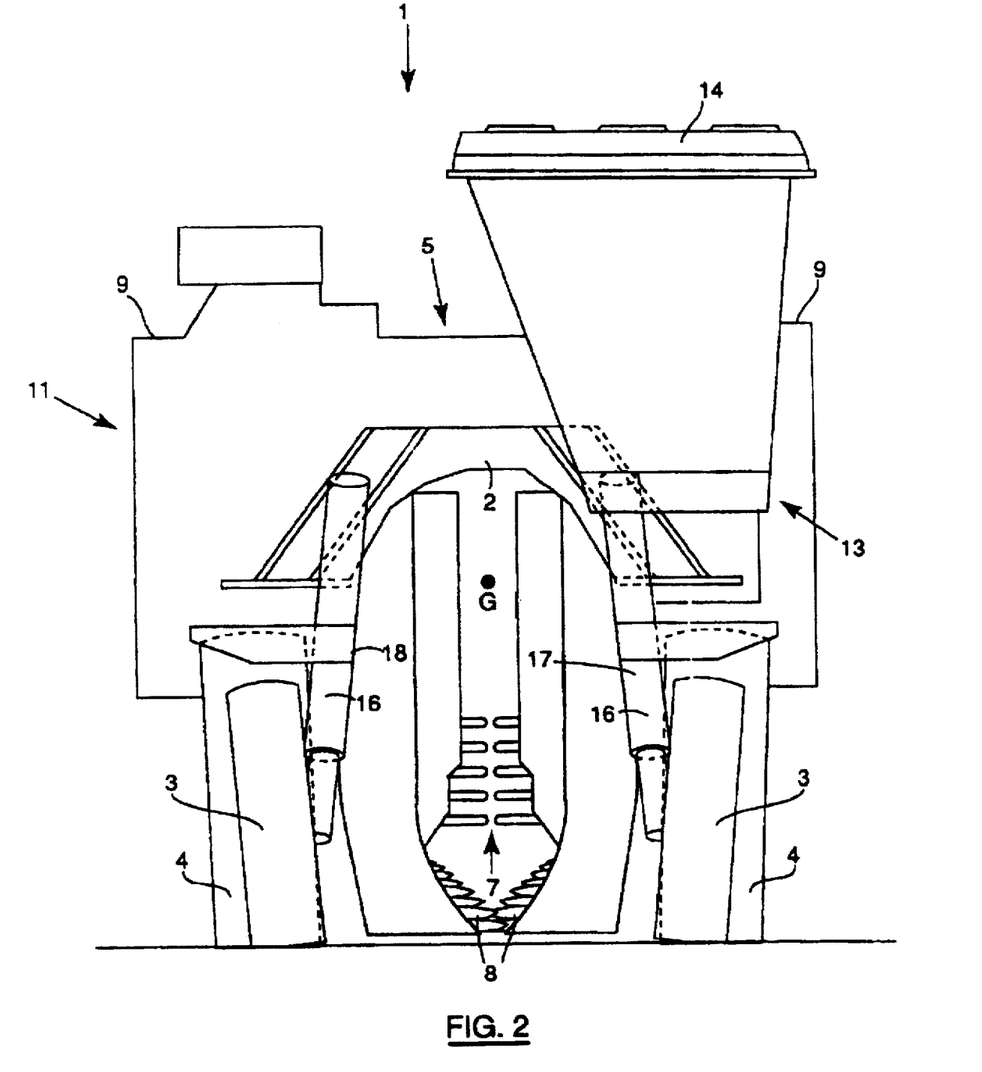
FIG. 2 is a schematic front view of the grape harvester of FIG. 1.

The utility vehicle shown in FIGS. 1 and 2 is a grape harvester of the general configuration disclosed in above mentioned U.S. Pat. No. 5,538,266, hereby incorporated by reference. The harvester, generally indicated by reference numeral 1, comprises a chassis or main frame 2, provided with front steerable wheels 3 and rear wheels 4. Both the front wheels 3 and the rear wheels 4 are driven for moving the frame 2 over the ground. The frame 2 is in the form of a gantry for straddling a row of plants, such as grape-vines. In known manner, the frame 2 carries a harvesting assembly 5, comprising a shaker assembly 7 for detaching the grapes from the vines and two elevator conveyors 8 for collecting the detached grapes and conveying them to two storage tanks 9 on the sides of vehicle 1. The frame 2 further carries an engine 11, providing the rotational power necessary to drive the various active members of the harvesting assembly 5 and also providing motive power to the wheels 3, since the vehicle 1 is of the self-propelled type.

The harvesting assembly 5 may be fixed in a permanent manner to the main frame 2 of the machine, or else, it may be made in the form of a removable assembly which is detachably affixed to the main frame 2, so as to be capable of being replaced by other equipment or accessories, such as spraying and pruning equipments, equipment for tilling the ground, etc.

The driving and harvesting functions of the vehicle are controlled by the operator from an operator's platform 13, which is attached to the front portion of the frame 2 above the left steering wheel 3. To increase the comfort of the operator, an environmentally insulated cab 14 is provided which surrounds the operator's platform 13.

Support columns 16 extend downwardly from each side of the forepart of the main frame 2. The columns 16 comprise hydraulic actuator means in the form of double-acting hydraulic rams or cylinders 17, 18. The front wheels 3 are rotatably mounted to the rod ends of the hydraulic cylinders 17, 18 and can be turned left or right about the axis of the columns 16 by steering means (not shown). Extension of the left cylinder 17 or right cylinder 18, raises the respective front side of the frame 2.

A pair of substantially vertical frame members 20 is welded on both sides of the vehicle 1 to the underside of the frame 2. A pair of rearwardly extending arms 21, to which the rear wheels 4 are rotatably mounted, is pivotally attached to the lower portion of the vertical frame members 20. The position of the arms 21 and hence of the wheels 4 is also controlled by hydraulic actuator means in the form of double-acting hydraulic cylinders 23, 24. The rod ends of these rear cylinders 23, 24 are pivotally mounted to the arms 21, while their head ends are equally pivotally mounted to the frame 2. Extension of the rear left cylinder 23 or rear right cylinder 24, raises the respective rear side of the frame 2.

The vehicle 1 may have an elevated center of gravity G, because its has to straddle the grape-vines and heavy parts, such as the engine 11 and the storage tanks 9 (when full) are mounted generally above the main frame 2.

Figure 3:
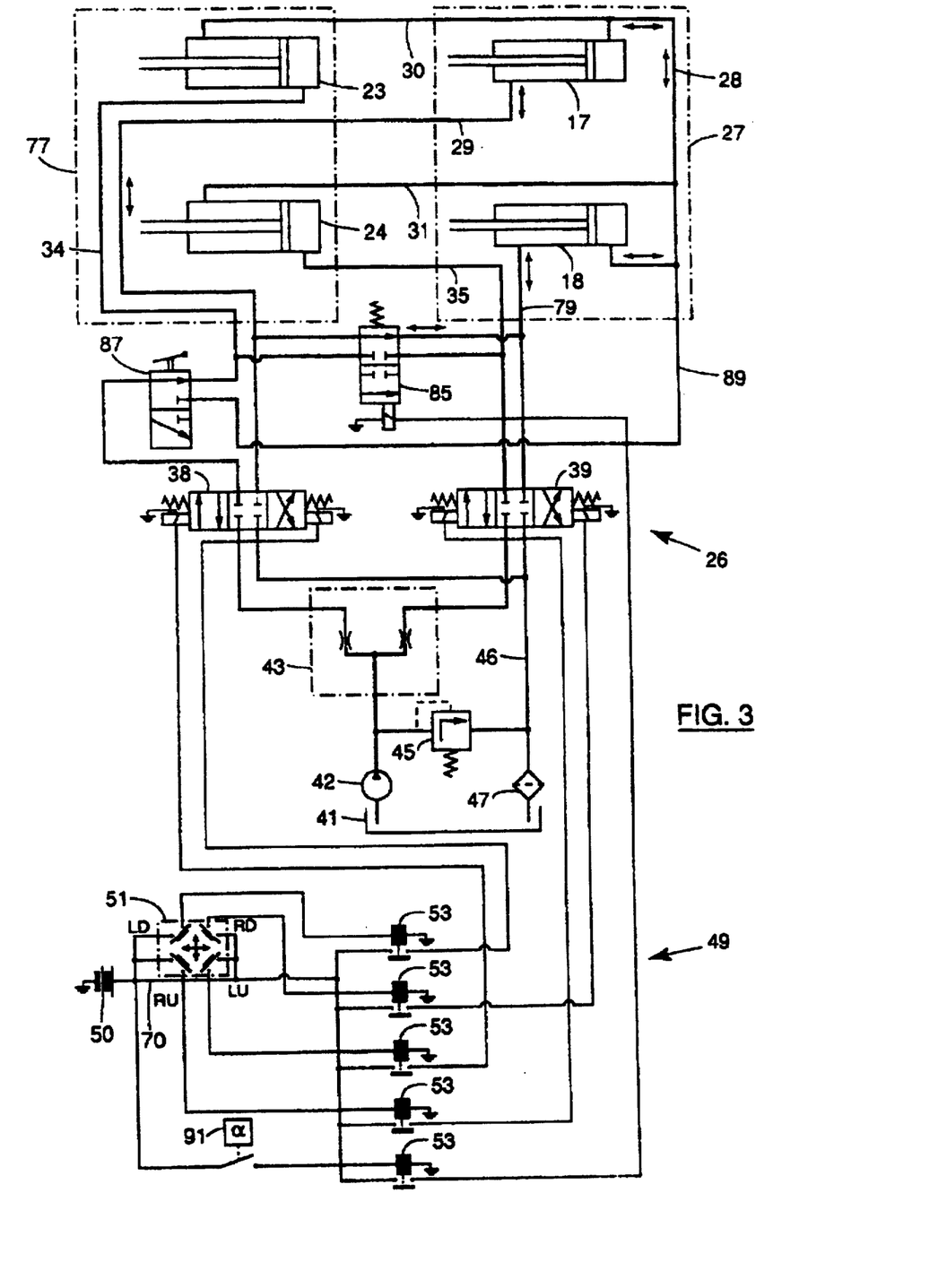
FIG. 3 is a hydraulic and electrical scheme of a control system for the hydraulic cylinders, showing fluid flow during uphill travel.
Figure 5:
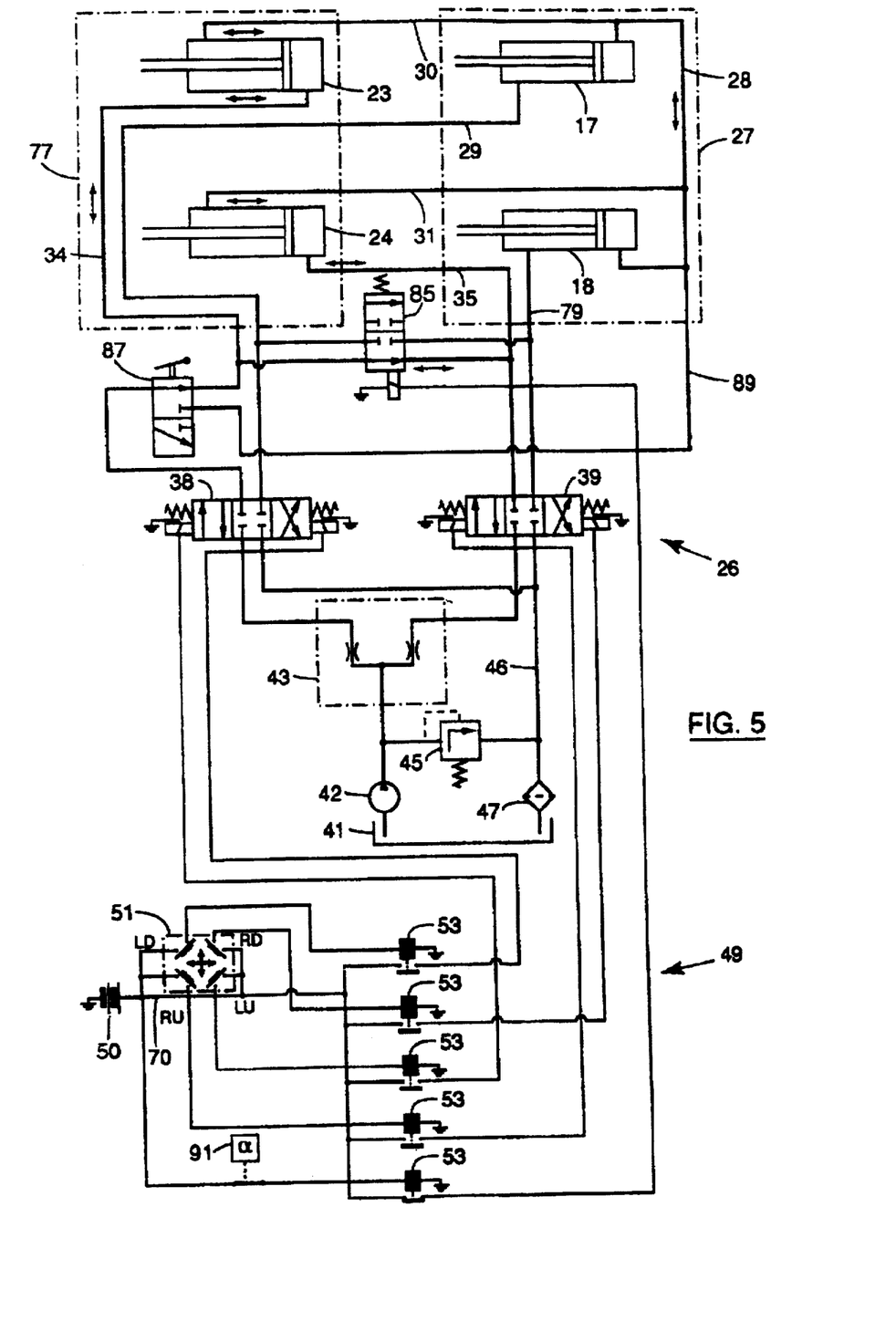
FIG. 5 is a scheme similar to FIG. 3, showing fluid flow during downhill travel.

A control system 26, 49 for the hydraulic actuator means is illustrated in FIGS. 3 and 5. It comprises hydraulic control means 26, which are linked to the double-acting hydraulic cylinders 17, 18, 23, 24 for extension and retraction thereof.

The head end chambers of the left and right front cylinders 17, 18 are interconnected by an upper oscillation line 28. A lower oscillation line is constituted by two hydraulic line portions 29, 79, which are linked to two ports of an oscillation control valve 85, being a solenoid operated control valve with four ports and two positions and having a rest position shown in FIG. 3, wherein these line portions 29, 79 are interconnected. The cylinders 17, 18 and the lines 28, 29, 79 constitute an oscillation structure 27 for the front wheels 3. Herein the weight of the front end of the main frame 2 is supported by the oil enclosed in the head end chambers of the front cylinders 17, 18 and the upper oscillation line 28. When external action on the rod of the left front cylinder 17 makes the same extend or retract, oil will freely circulate through the oscillation lines 28, 29, 79 between the front cylinders 17, 18, such that the right front cylinder 18 is retracted or extended in the opposite sense. External action on the right front cylinder 18 has an analogous effect on the left front cylinder 17. As these cylinders 17, 18 have equal dimensions, the wheels 3 at the ends thereof are moved with an equal amount, as if they were mounted on an axle 56 which is articulately connected to the front of the frame 2.

The head end chambers of the left and right front cylinders 17, 18 are also connected by a left and a right elevation line 30, 31 to the rod end chambers of the respective left and right rear cylinders 23, 24, so that a movement of a piston of one of the rear cylinders 23 or 24 engenders a similar movement of the piston of the corresponding front cylinder 17 or 18 in a master-slave configuration. The dimensions of the rods and the cylinder bodies have been calculated as to make the front and the rear portions on the same side of the frame 2 rise or fall with an equal amount, so that the complete side is moved up or down in a parallel way.

The head end chamber of the rear left cylinder 23 is linked by a left control line 34 to an end levelling valve 87, which is a manually operated control valve with three ports and two positions. In its lower position as shown in FIGS. 3 and 5, the valve 87 connects the left control line 34 to a left, solenoid operated control valve 38 with four ports and three positions. Another port of the left control valve 38 is connected through the lower oscillation line portion 29 to the rod end of the front left cylinder 17. In its upper position (not shown) the end levelling valve 87 connects the inlet port of the left control valve 38 to an end levelling line 89 which is linked to the upper oscillation line 28.

The head end chamber of the rear right cylinder 24 is linked by a right control line 35 to a right, solenoid operated control valve 39 with four ports and three positions. Another port of this valve 39 is connected through the lower oscillation line portion 79 to the rod end chamber of the front right cylinder 18. The left and right control lines 34, 35 are also connected to the oscillation control valve 85, which inhibits oil circulation between these lines 34, 35 when not actuated.

When the left and right control valves 38, 39 are in their rest positions, the ports thereof are closed. When the oscillation control valve 85 is equally in its rest position, the oil in the left and right control lines 34, 35 cannot escape, such that the pistons of the rear cylinders 23, 24 are blocked by the oil trapped in their head end chambers. Any upward or downward movement of the rear wheels 4 relative to the frame 2 is impeded, as if they were mounted onto a fixed rear axle 55.

Hence, when the vehicle 1 is travelling over uneven ground, the vertical position of the frame 2 is defined by the rear wheels 4, while the front wheels 3 are permitted to move up or down in order to remain in constant engagement with the ground, even when pits or bumps are encountered. As ground contact is secured for all wheels 3, 4, none of them can start to spin freely and no consequent loss of traction power can occur.

Figure 4:
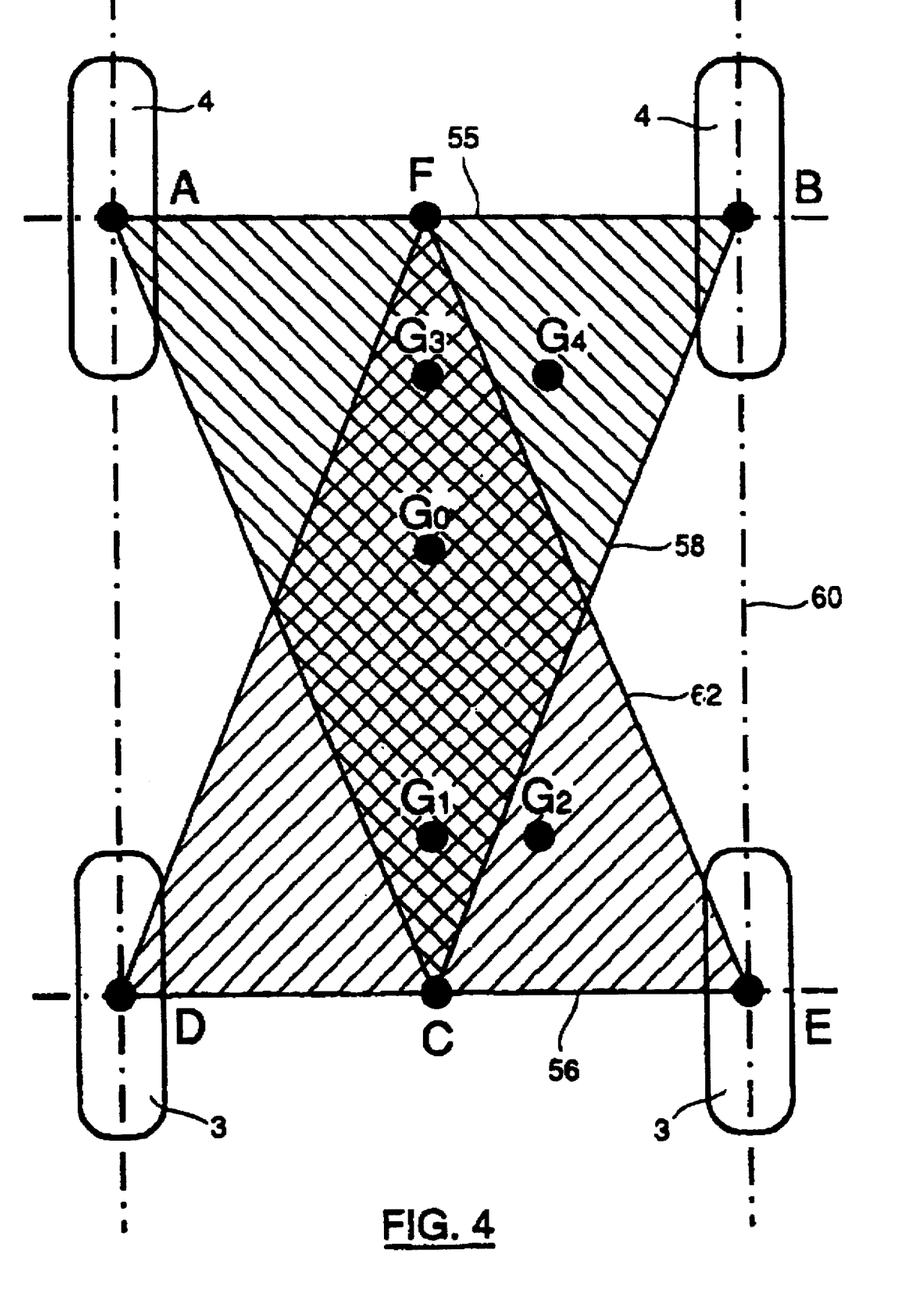
FIG. 4 is a diagram of the frame and the wheels of the grape harvester.

As illustrated in FIG. 4, the condition for static stability of the vehicle 1 is that the vertical projection $G_i$ of its center of gravity G falls within the polygon of its rest points. Under the conditions described above, the rest points at the rear end of the vehicle 1 are defined by the undersides A and B of the rear wheels 4. The virtual axle 55, which passes through the centers of the rear wheels 4, is secured to the frame 2. At the front end of the vehicle 1, the undersides D and E of the front wheels 3 do not constitute fixed rest points, as they are permitted to move relatively to the frame 2, but as their movements are mutually linked by the oscillation structure 27, the virtual axle 56, which passes through the centers of the front wheels, oscillates as if it was attached to an articulation point C which is affixed to the front end of the vehicle 1. Hence, the stability polygon 58 is constituted by the triangle ABC.

As shown in FIG. 5, the oscillation control valve 85 may be actuated to disconnect the lower oscillation line portions 29, 79 and to interconnect the left and right control lines 34, 35. When the left and right control valves 38 and 39 are kept in their rest positions, the pistons of the front cylinders 17, 18 are immobilized by the oil trapped in their rod end chambers and the corresponding line portions 29, 79. Hence the front wheels 3 and their virtual axle 56 are kept in a fixed position to the main frame 2.

Concurrently, oil may flow freely between the head end chambers of the rear cylinders 23, 24 through the control lines 34, 35. The rod end chambers of the same cylinders 23, 24 remain interconnected through the elevation lines 30, 31 and the oscillation line 28. The hydraulic cylinders 23, 24 and the lines 28, 30, 31, 34 constitute an oscillation structure 77 for the rear wheels 4, akin to the oscillation structure 27 for the front wheels 3. The weight of the rear end of the main frame 2 is born by the oil enclosed in the head end chambers of the rear cylinders 23, 24 and the control lines 34, 35. When external action on the rod of the rear left cylinder 23 makes the same extend or retract, oil will freely flow through the control lines 34, 35, so that the rear right cylinder 24 is retracted or extended in the opposite sense. External action on the rear right cylinder 24 has an analogous effect on the rear left cylinder 23. As these cylinders 23, 24 have equal dimensions, the wheels 3 at the rod ends thereof are moved with an equal amount, such that their virtual axle 55 oscillates, as if it was connected at an articulation point F at the rear end of the frame 2.

Under these conditions the vertical position of the frame 2 is defined by the front wheels 3, while the rear wheels 4 are permitted to move up or down in order to remain in constant engagement with the ground, even when pits or bumps are encountered. As ground contact is still secured for all wheels 3, 4, none of them can start to spin freely and no consequent loss of traction power can occur.

However, the original stability polygon 58 of the vehicle 1 has been replaced with a new stability polygon 62. The rest points at the front end of the vehicle 1 are now defined by the undersides D and E of the front wheels 3. Their virtual axle 56 is secured to the frame 2. At the rear end of the vehicle 1, the undersides D and E of the front wheels 3 do no longer constitute fixed rest points, as their virtual axle 56 oscillates as if it was attached to the articulation point F, fixed to the rear end of the vehicle 1. Hence, the new stability polygon 62 is constituted by the triangle DEF.

The hydraulic control means 26 further comprise a gear pump 42, which is driven by the engine 11 and takes oil from an oil tank 41 for delivery to an oil flow divider 43, which in turn delivers the pressurized oil to the left and right control valves 38, 39. The oil pressure is controlled in a conventional manner by a pressure relief valve 45, installed between the pump 42 and a return line 46, which delivers the oil back to the tank 41 through an oil filter 47.

The control valves 38, 39 and 85 are steered by means of electrical command means 49, comprising a battery 50, a manually controlled multi-functional switch 51 with four contacts RD, RU, LD, LU, a sensor 91 and electrical circuitry connected to the solenoids of said valves 38, 39 and 85. In a conventional manner, the switch 51 and the sensor 91 are not directly linked to the valves 38, 39, but command a set of relays 53, which are connected to the battery 50 via a primary plus line 70. Their aim is to prevent the burning of the contacts of the switch 51 and the sensor 91 by the actuating current of the valve solenoids.

The sensor 91 is a sensor capable of detecting conditions in which the vertical projection $G_i$ of the center of gravity G shifts from the front wheels 3 to the rear wheels 4 and vice versa. This may be a sensor 91 which senses the inclination α of the frame 2 to the horizontal in the longitudinal direction of the harvester 1. The output from the sensor 91 opens the electrical circuitry to the oscillation control valve 85 when the harvester 1 is travelling along a substantially horizontal or uphill path, and closes the same when the harvester 1 is travelling along a downhill path. Such sensor 91 may be realized by a balanced, oil dampened lever which engages one or more electrical contacts or by more sophisticated apparatus, involving electronics and strain gauges or photo-electrical cells.

When the harvester 1 is travelling on level ground, the solenoid of the oscillation control valve 85 is not actuated as shown in FIG. 3. When no levelling command is given via the multifunctional switch 51, the left and right control valves 38, 39 are equally in their rest positions and fix the rear wheels 4 to the frame 2, while the front cylinders 17, 18 are permitted to extend and retract in opposition to each other.

The vertical projection $G_0$ of the center of gravity G of the harvester 1 lies well within the stability triangle ABC, such that small pits or bumps encountered by the rear wheels 4 may tilt the frame 2 sideways without harm to the overall stability of the harvester 1.

When the harvester is travelling along an uphill path the projection of gravity center G shifts to a new location $G_3$, closer to the triangle base AB. The stability margin, defined by the smallest of the distances of the projection $G_i$ to either of the triangle sides BC or AC, has even improved such that the frame 2 may tilt sideways and the projection of G may shift to $G_4$ without immediate risk of the harvester 1 turning over.

Otherwise, when the harvester 1 is travelling down a steep hill with its rear end at a higher level than its front end, the vertical projection of G is shifted in a forward direction towards $G_1$ and the stability margin to the triangle sides BC and AC becomes critical. A small sideways movement of the frame 2 would suffice to shift the projection to a location $G_2$ outside the stability polygon 58. In case the front wheels 3 would still behave as if they were mounted to an articulated axle 56, the harvester 1 would tip over completely, unless the operator reacted immediately by restoring the upright position of the frame 2.

However when the harvester path changes from uphill to downhill, the longitudinal inclination of the frame 2 changes and the sensor 91 closes the electrical circuitry to the solenoid of the oscillation control valve 85. The cylinders 17, 18 of the front wheels 3 are blocked and the rear wheels 4 are permitted to oscillate about the articulation point F, such that the triangle DEF now constitutes the effective stability polygon. The new stability margin is defined by the smallest of the distances of the projection $G_i$ to either of the triangle sides DF or EF. Hence the location of the vertical projection of G at $G_1$ or even $G_2$ still presents very good stability characteristics as these points lie well within the stability polygon 62. Small variations in the sideways inclination as caused by ground unevenness will not make the vertical projection cross the borderlines of the polygon 62, such that there is no substantial risk of the harvester 1 tipping over.

When the harvester 1 returns to level terrain or starts travelling uphill again, the signal from the sensor 91 releases the oscillation control valve 85 thereby fixing the vertical position of the rear wheels 4 and permitting oscillatory movement of the front wheels 3 to the frame 2. The original stability triangle ABC has become effective again, such that the stability margin is optimized, without loss of traction power as all wheels 3, 4 are kept in firm engagement with the ground.

The control system 26, 49 equally comprises means for adjusting the position of the frame 2 to the ground. Besides the rest position in which no contacts are closed, the lever of the multifunctional switch 51 has four operative positions in each of which two adjacent contacts are closed. The operator thereby commands sideways and vertical movement of the frame 2.

When the contacts LD and RD are closed, both control valves 38, 39 are shifted to the left, such that pressurized oil is supplied to the rod end chambers of both front cylinders 17, 18. The oil from their head end chambers flows via the left and right elevation lines 30 and 31 to the rod ends of the corresponding rear cylinders 23, 24, while the head end chambers of the latter are connected via the left and right control lines 34, 35 and the control valves 38, 39 to the return line 46. As a result, all four hydraulic cylinders 17, 18, 23, 24 retract simultaneously and both sides of the frame 2 are lowered concurrently.

Otherwise, when the contacts RU and LU are closed, both control valves 38, 39 are shifted to right for supplying pressurized oil to the head end chambers of both rear cylinders 23, 24. The oil from their rod end chambers flows via the elevation lines 30, 31 to the head ends of the corresponding front cylinders 17, 18, while the rod ends of the latter are connected via the articulation line portions 29, 79 and the control valves 38, 39 to the return line 46. As a result, all four cylinders 17, 18, 23, 24 extend simultaneously and both sides of the frame 2 are raised concurrently.

These operations, which may be used to adjust the harvesting assembly 5 to the height of the vines, do not involve an oil flow through the oscillation control valve 85, such that the state of the latter does not affect the levelling operations. The frame 2 may be raised or lowered irrespective of its longitudinal inclination, such that these operations may be performed equally during uphill or downhill travelling.

When the operator closes contacts LD and RU, the left control valve 38 is shifted to the left and the right control valve 39 is shifted to the right. Pressurized oil is supplied to the rod end chamber of the front left cylinder 17 and the head end of the rear right cylinder 24, while the head end of the rear left cylinder 23 and the rod end of the front left cylinder 18 are connected to the return line 46. The rear right cylinder 24 extends and provides an oil flow from its rod end via the right elevation line 31 to the head end of the front right cylinder 18, which has to extend equally, such that the right side of the frame 2 is lifted up in a parallel way.

Meanwhile, oil flows from the head end of the rear left cylinder 23 to the return line 46 and from the head end of the front left cylinder 17 via the left elevation line 30 to the rod end of the rear left cylinder 23. Both left cylinders 17, 23 retract simultaneously and the left side of the frame 2 is lowered in a parallel way. As a result, the frame 2 is tilted sideways to the left, but the height of the center of the frame 2 is substantially maintained.

In a completely analogous manner, the closing of the contacts RD and LU causes the extension of the left cylinders 17, 23, and the retraction of the right cylinders 18, 24, such that the left side of the frame 2 is lifted up and the right side is lowered. In consequence, the frame 2 is tilted sideways to the right, but the height of its center is equally substantially maintained.

These sideways movements may be used to return the harvester 1 to an upright position when harvesting on lateral slopes. These operations are equally not influenced by the position of the oscillation control valve 85, such that the operator may level the frame 2 irrespective of the longitudinal inclination of the slope.

It may be required to adjust the longitudinal inclination of the frame 2 itself, e.g. to compensate for oil leaks in one or other of the hydraulic cylinders 17, 18, 23, 24. The operator who wants to level the harvester 1 lengthwise, manually lifts the end levelling valve 87 into its upper position, thereby linking the end levelling line 89 to the left control valve 38. When the operator now closes contacts LU and RU of the multifunctional switch 51, the left and right control valves 38, 39 shift to the right and pressurized oil is fed via the end levelling line 89 and the oscillation line 28 to the head ends of the front cylinders 17, 18. Simultaneously, their rods ends are linked via the line portions 29, 79 to the return line 46, such that the front cylinders 17, 18 extend accordingly.

The left control line 34 is blocked by the end levelling valve 87 and the oscillation control valve 85, when the latter is in its rest position. Hence the rear left cylinder 23 is blocked also. The rod end and head end chambers of the rear right cylinder 24 are pressurized simultaneously by the oil from the right control line 35 on the one hand, and from the lines 89 and 31 on the other hand. Consequently this right cylinder 24 has no particular tendency to extend or retract. As both rear cylinders 23, 24 are immobilized, the rear end of the frame 2 does not rise or descend, while its front end is being raised by the front cylinders 17, 18.

To lower the front end of the frame 2, the operator holds the end levelling valve 87 into its upper position and shifts the lever on switch 51 to close contacts LD and RD. The control valves 38, 39 shift to the left such that oil from the end level line 89 and the head ends of the front cylinders 17, 18 can drain via the end levelling line 89 to the tank 41. Meanwhile pressurized oil is fed via the line portions 29, 79 to the rod end chambers of the same cylinders 17, 18, which retract accordingly.

The left rear cylinder 23 is blocked by the valves 87 and 85 as described above. Both chambers of the right rear cylinder 24 are now linked to the return line 46, such that there is no particular tendency to extend or retract for this cylinder 24. As both rear cylinders 23, 24 are immobilized once more, the rear end of the frame 2 does not rise or descend, while its front end is lowered by the action of the front cylinders 17, 18.

Consequently, the operator has the means to raise or lower only one end of the frame 2, while the oscillation control valve 85 is in its rest position. An analogous result is equally obtained when this valve 85 is actuated as shown in FIG. 5, i.e. during downhill travel.

Other embodiments of the present invention can be thought of without departing from the original idea of the invention. For example, a pair or all of the wheels 3, 4 may be replaced with other ground-engaging members, such as tracks or sledges. The hydraulic actuator means may comprise hydraulic motors for extending or retracting mechanical spindles in order to level the vehicle 1. The control system 26, 49 can also comprise an automatic levelling system, which senses the transverse inclination of the frame 2 and actuates the control valves 38, 39 in response thereto. The transverse inclination may be measured by means of a mechanical pendulum or an electronic inclinometer. The hydraulic control means 26 may equally comprise a by-pass valve, which directs the oil from the oil pump 42 immediately to the return line 46. When pressurized oil is needed at the control valves 38, 39, the by-pass valve is closed and oil pressure is built up until the relief valve 45 opens.

Although this invention has been described in use on a grape harvester, it can also advantageously be installed on other straddling vehicles such as vineyard tractors, vineyard spraying machines, coffee harvesters, etc.

It will be appreciated that, according to the invention, means are provided for improving the stability of a utility vehicle 1, which is travelled along and across slopes. Oscillation control means are provided for adapting the stability polygon 58, 62 to the configuration which is most suited for the vertical projection $G_i$ of the center of gravity G, such that the risks for tipping over are minimized, while firm ground contact remains guaranteed for all wheels.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. A utility vehicle (1) comprising:
    a generally horizontal, rectangular frame (2) with opposed sides and opposed ends;
    two first ground-engaging members (3) at a first end of said frame (2) and two second ground-engaging members (4) at an opposite, second end thereof;
    first suspension means, supportingly mounted between said frame (2) and said first ground-engaging members (3) and comprising first oscillation means (27) for accomplishing movement of one first ground-engaging member (3) in opposition to the movement of the other first ground-engaging member (3);
    suspension control means (26, 49), comprising first oscillation control means (85), operatively linked to said first oscillation means (27) and changeable between an enabling and an inhibiting state, wherein said movement of the first ground-engaging members (3) is permitted and obstructed respectively; and
    second suspension means, supportingly mounted between said frame (2) and said second ground-engaging members (4)

characterized in that:
    said second suspension means comprise second oscillation means (77) for accomplishing movement of one second ground-engaging member (4) in opposition to the movement of the other second ground-engaging member (4); and
    said suspension control means (26, 49) further comprise second oscillation control means (85), operatively linked to said second oscillation means (77) and changeable between an enabling and an inhibiting state, wherein said movement of the second ground-engaging members (4) is permitted and obstructed respectively.

2. A utility vehicle according to claim 1, characterized in that said first and second oscillation control means (85) are linked to prevent a simultaneous enabling state in both the first and the second oscillation control means (85).

3. A utility vehicle according to claim 1, characterized in that said suspension control means (26, 49) further comprise a sensor (91), sensing a variable indicative of the relative position of the vertical projection ($G_i$) of the center of gravity (G) of the utility vehicle (1) with respect to the first and second ground-engaging members (3, 4) and generating an output which is used in changing the state of the first and the second oscillation control means (85).

4. A utility vehicle according to claim 3, characterized in that:
    when said vertical projection ($G_i$) lies in the vicinity of said first ground-engaging members (3), the first oscillation control means (85) are set in the oscillation inhibiting state and the second oscillation control means (85) in the oscillation enabling state; and
    when said vertical projection ($G_i$) lies in the vicinity of said second ground-engaging members (4), the second oscillation control means are set in the oscillation inhibiting state and the first oscillation control means in the oscillation enabling state.

5. A utility vehicle according to claim 3, characterized in that said sensor (91) senses the inclination of the frame (2) in the direction from said first end to said second end.

6. A utility vehicle according to claim 1, characterized in that:
    said first suspension means comprise two first hydraulic actuator means (17, 18) and said second suspension means comprise two second hydraulic actuator means (23, 24);
    said first oscillation means (27) comprise a first hydraulic oscillation line (29, 79) interconnecting said first hydraulic actuator means (17, 18);
    said second oscillation means (77) comprise a second hydraulic oscillation line (34, 35) interconnecting said second hydraulic actuator means (22, 23); and
    said first and second oscillation control means comprise hydraulic valve means (85) operable to break said first and second hydraulic line (29, 79 and 34, 35) respectively.

7. A utility vehicle according to claim 6, characterized in that:
    said first hydraulic actuator means and said second hydraulic actuator means are first and second hydraulic cylinders (17, 18 and 23, 24), having head end and rod end chambers;
    said first hydraulic oscillation line (29, 79) interconnects the rod end chambers of the first hydraulic cylinders (17, 18) and said second hydraulic oscillation line (34, 35) interconnects the head end chambers of the second hydraulic cylinders (23, 24).

8. A utility vehicle according to claim 6, characterized in that said hydraulic valve means comprise a single 4/2 valve (85) connected to both the first and second hydraulic line (29, 79 and 34, 35).

9. A utility vehicle according to claim 1, characterized in that said suspension control means (26, 49) further comprise levelling means for changing the position of said first ground-engaging members (3) and said second ground-engaging members (4) with respect to said frame (2) in order to vary the height and/or the inclination of said frame (2) with respect to the ground.

10. A utility vehicle according to claim 9, characterized in that said levelling means comprise hydraulic circuitry (26) linked to said first hydraulic actuator means (17, 18) and second hydraulic actuator means (22, 23), and via further hydraulic valve means (38, 39) to a source (42) of pressurized oil and a drain (46).

11. A utility vehicle according to claim 10, characterized in that:

said further valve means (38, 39) comprises a first side levelling valve (38), linked to a first hydraulic actuator means (17) and a second hydraulic actuator means (23) on one side of the frame (2), and a second side levelling valve (39), linked to the other first hydraulic actuator means (18) and the other second actuator means (24) on the other side of said frame (2); and said levelling means further comprise command means (51) for simultaneous actuation of both the first and the second side levelling valves (38 and 39) to vary the sideways inclination of the frame (2) or the total height of the frame (2).

12. A utility vehicle according to claim 11, characterized in that:

said first and second side levelling valves (38 and 39) are solenoid controlled 3/4 valves and said command means (51) comprise a closing contact for each solenoid of said side levelling valves (38, 39); and said command means (51) further comprises a lever for simultaneous closing of two adjacent contacts.

13. A utility vehicle according to claim 9, characterized in that said levelling means comprise end levelling means for varying the inclination of the frame (2) in the direction from said first end to said second end.

14. A utility vehicle according to claim 13, characterized in that said end levelling means comprise a hydraulic end levelling valve (87) incorporated into said hydraulic circuitry (26) such that actuation of said valve (87) enables movement of either the first actuator means (17, 18) or the second actuator means (23, 24) by actuation of one of said side levelling valves (38/39), while said end levelling valve (87) inhibits movement of at least one of the second, respectively first actuator means (23, 24/17, 18).

* * * * *